United States Patent [19]
Munzner et al.

[11] 3,960,522
[45] *June 1, 1976

[54] CARBON-CONTAINING MOLECULAR SIEVES

[75] Inventors: Heinrich Munzner, Essen-Kray; Heinrich Heimbach, Bochum; Werner Korbacher, Essen-Borbeck; Werner Peters, Wattenscheid; Harald Juntgen, Essen-Heisingen; Karl Knoblauch, Essen; Dieter Zundorf, Essen-Heisingen, all of Germany

[73] Assignee: Bergwerksverband GmbH, Essen, Germany

[ * ] Notice: The portion of the term of this patent subsequent to Apr. 2, 1991, has been disclaimed.

[22] Filed: Feb. 21, 1974

[21] Appl. No.: 444,383

Related U.S. Application Data

[62] Division of Ser. No. 161,211, July 9, 1971, Pat. No. 3,801,513.

[30] Foreign Application Priority Data

Apr. 23, 1971 Germany............................ 2119829

[52] U.S. Cl.......................................... 55/68; 55/75
[51] Int. Cl.².......................................... B01D 53/14
[58] Field of Search................ 55/33, 58, 62, 68, 75, 55/387, 389; 210/63, 68, 71; 252/421, 444, 445

[56] References Cited
UNITED STATES PATENTS

| 3,140,931 | 7/1964 | McRobbie ......................... 55/75 X |
| 3,140,932 | 7/1964 | McKee................................ 55/75 X |
| 3,140,933 | 7/1964 | McKee................................ 55/75 X |
| 3,164,454 | 1/1965 | Wilson................................ 55/75 X |
| 3,176,444 | 4/1965 | Kiyonaga ........................... 55/75 X |
| 3,184,406 | 5/1965 | Yeo et al. ........................... 55/75 X |
| 3,184,518 | 5/1965 | Sanders et al. ..................... 55/75 X |
| 3,226,914 | 1/1966 | Griesmer et al. ................... 55/75 X |
| 3,442,819 | 5/1969 | Herbert............................... 55/75 X |
| 3,801,513 | 4/1974 | Munzner....................... 252/445 X |

Primary Examiner—Theodore A. Granger
Attorney, Agent, or Firm—Michael J. Striker

[57] ABSTRACT

Process for preparing carbon-containing molecular sieves adapted for separating small molecular gases, in particular oxygen, from nitrogen, which comprises treating coke having a content of volatile components of up to 5% at 600° – 900°C with a hydrocarbon which splits off carbon whereby the split-off carbon is deposited in the carbon framework of the coke thereby narrowing the existing pores.

17 Claims, 1 Drawing Figure

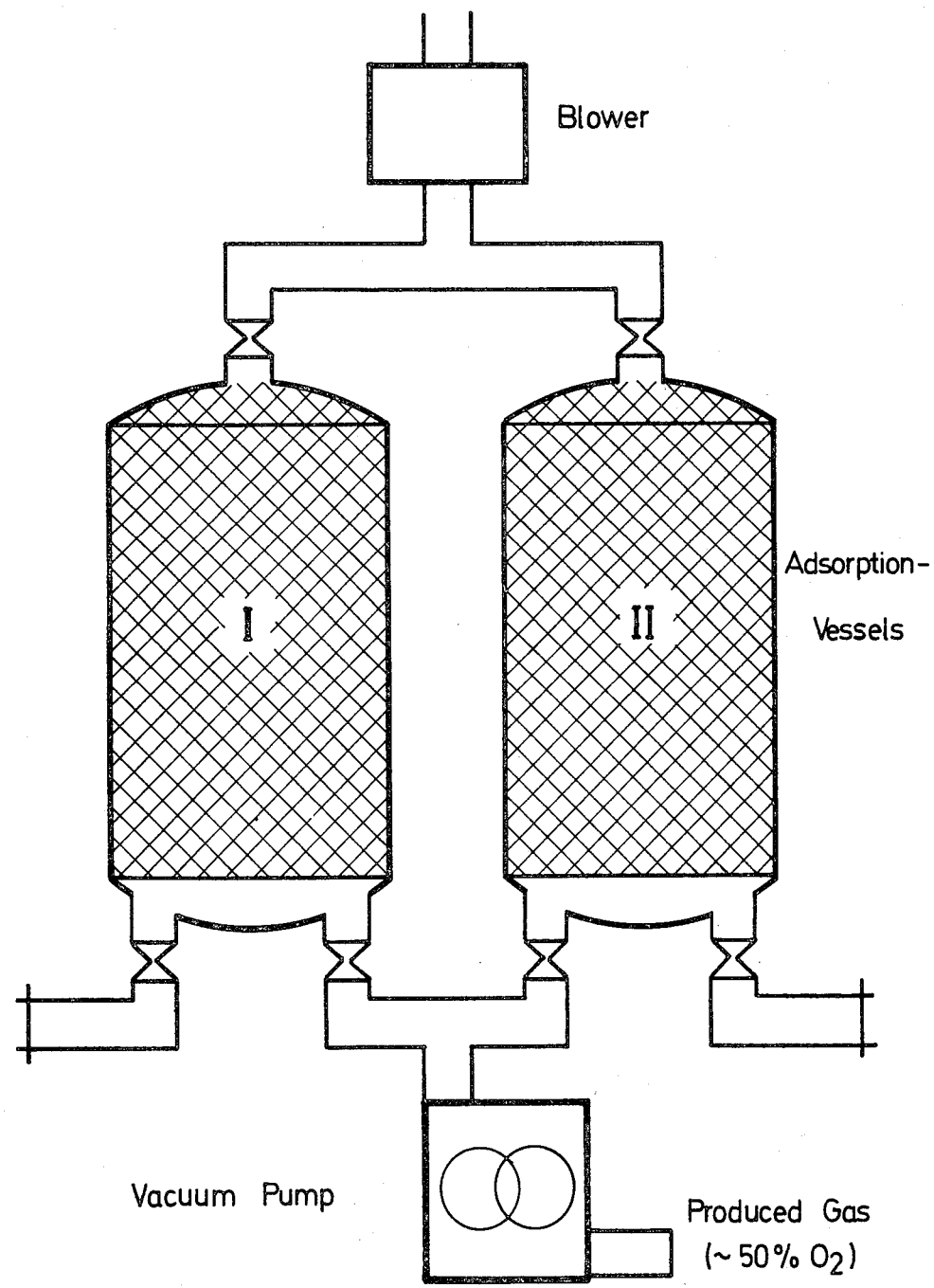

CARBON-CONTAINING MOLECULAR SIEVES

This is a division of application Ser. No. 161,211 filed July 9, 1971, now U.S. Pat. No. 3,801,513.

This invention relates to a carbon-containing molecular sieve and more particularly to a carbon containing molecular sieve characterized by its ability to separate small molecular gases from gas mixtures containing the same.

The known silicate molecular sieves are possessed of the property that they can adsorb a single gas from gas mixtures containing the same. The carbon-containing molecular sieves such as those manufactured by pyrolysis of plastics e.g. polyvinylidene chloride, do not evidence any, or evidence only a very slight, selectivity respecting the adsorption of gases having similar gas kinetic molecular diameters, such as for instance oxygen and nitrogen, argon and oxygen or helium and methane. Therefore for carrying out a practical and technical scale separation of oxygen and nitrogen in air, the known carbon-containing molecular sieves are not suitable and expecially so since it is difficult to obtain them in large amounts.

The object of the instant invention is to provide a new type of carbon-containing molecular sieve which is characterized in that it can for example adsorb oxygen from more rapidly than nitrogen.

Another object of this invention is to provide a simple and economically feasible method of manufacturing such carbon-containing molecular sieves.

Still another object of this invention is to provide a method for the preparation of such molecular sieves which affords the possibility of setting up large-scale installations for gas separation procedures in connection with which these molecular sieves will be used in ton amounts.

Still another object of this invention is to provide a process for increasing the oxygen content of air to provide concentrations of up to 75% $O_2$.

These and other objects and advantages of the invention will become apparent from a consideration of the following disclosure.

In accordance with the invention it has now been found that coke having a content of volatile components of up to 5%, on being treated for a certain time at 600° – 900°C with a hydrocarbon which splits off carbon-results in the formation of molecular sieves of excellent quality. In accordance with the invention there is now provided a process for manufacturing carbon-containing molecular sieves for use in the separation of small molecular gases, in particular oxygen, from nitrogen, which comprises treating coke having a content of volatile components of up to 5% with a hydrocarbon which splits off carbon at 600° – 900°C whereby narrowing of the pores already present in the coke occurs. The finely dispersed carbon formed is deposited out in the pores of the coke and brings about a further decrease in the pore size of the coke's already relatively small pores.

To produce a molecular sieve type carbon suitable for separating oxygen from nitrogen, the average pore size of the ultra fine pore system must be below approximately 3 A after treatment. For separating even smaller gas molecules, this average pore diameter has to be even smaller. By changing the intensity of the treatment of the coke with hydrocarbons which split off carbon at 600° – 900°C, the average pore diameter can be adjusted according to the gas mixture to be separated therewith.

The quality and suitability of the coke thus produced can be established by passing air for a one minute period upwardly through a tube (1L) filled with the carbon-containing molecular sieves, the gas being conducted at a velocity of 30 cm/sec., and thereafter analyzing the adsorbed gas following desorption by vacuum filtering.

When tested as just set out, coke produced in accordance with the invention results in a gas having a composition of 35 or more volume % oxygen and 65 or less volume % nitrogen.

In order to obtain the desired constriction or narrowing of the pores, the treatment of the coke with the hydrocarbon is carried out for 1 to 60 minutes, or even longer. The cooling of the heated material is then carried out most advantageously in the treatment atmosphere. There can also be used during the cooling streams of an inert gas such as for instance, nitrogen. This accelerates the cooling and serves the additional purpose that the introduction of any oxygen is avoided during cooling.

As the coke, there is suitable for use in the process all forms of coke containing up to 5% volatile components such as cokes derived from mineral coal including anthracite, brown coal, peat, coconut shell and wood and also the known petroleum cokes, cokes prepared by the pyrolysis of plastics and active carbons. In order that the gases to be separated can pass through the molecular sieves it is advantageous in accordance with the invention that as the starting material there be used a coke having a designated particle size and in particular having a particle size of 0.1 – 20 mm.

As the hydrocarbon, there may be advantageously used in the treatment the exhaust gas of a coke-forming process, long distance illuminating gas, city gas, coking gas and all of the known hydrocarbons which are thermally decomposed with the splitting off of carbon such as benzene, toluene, xylene, naphthalene, methane, ethane, hexane, cyclohexane, ethylene, acetylene, methanol, ethanol, isopropanol, ethylene chloride and tetrachlorinated hydrocarbons.

Instead of using coke which is brought to the desired particle size through size reduction, there can also be used in accordance with the invention, coke formed and shaped to have the respective dimensions. In this connection, there come into consideration ball-, cylinder-hollow cylinder- and egg-shaped coke particles as well as larger coke briquettes which are reduced to the required particle size. The manufacture of shaped coke particles can take place using various methods:

1. Coke and/or carbon is suitably formed into briquettes according to any desirable briquette-forming process, for instance by using 15 – 40% of a binding agent such as pitch, bitumin, tar or tar oil and coking the shaped bodies thus formed at 600° – 900°C. The briquetting can take place at normal temperature or elevated temperature using a stamping press, extrusion press or rolling press.

2. Carbon is shaped, if necessary in admixture with pitch, bitumin, tar or tar oil, and pelletzed to form balls of the desired size and these pellets then coked.

The treatment in accordance with the invention can be carried out by heating the cold coke under an inert gas stream to a temperature of up to 600° – 900°C and then, under a carbon splitting atmosphere maintaining the coke at this temperature for prolonged periods.

Alternatively the treatment can be carried out directly after a coking of the starting material in the same or a different reactor. If the coking is carried out with starting materials containing pitch, bitumin, tar or tar oil, there are formed in the process, large amounts of gaseous coking products during the heat treatment. As far as these coking products are not for example separated off with a rinsing or scavenger gas, the desired atmosphere is automatically adjusted so that the gaseous coking products already exert the same effect as a hydrocarbon which splits off carbon. In this case, it is possible to avoid introduction of at least a part of the hydrocarbon. Often the constitution of the coke can be modified through the additional introduction of a hydrocarbon and also in such cases there can be provided a further increase in the separating capacity of the coke.

Technical application of the molecular sieve type carbons which are intended to increase the oxygen content of air, or the content of another component in a known gas mixture, is further explained by the process illustrated in the drawing which forms a part of this disclosure. In the process, two adsorption vessels I and II are alternately charged with air and depleted of the accumulated oxygen by vacuum. The pressure during the charging phase is maintained at between 0 and 40 atm, desorption taking place at pressures ranging to a minimum of 20 Torr. The duration of the adsorption and desorption phases, respectively is between 0.5 and 5 minutes. The gas volume necessary for the charge cycle amounts to 2 to 20 times that of the adsorption vessel.

The drawing shows a typical arrangement of apparatus utilized in practising the method of the invention.

The following Examples are given in order to more fully illustrate the invention and are in no manner to be construed as limiting the scope thereof.

EXAMPLE 1

77 Weight parts of mineral coal all of the particles of which have a particle size of less than 0.08 mm was treated in a fluidized bed with air having a temperature of 230°C so as to obtain an oxygen content of up to 12 weight %. Then, the coal was mixed with 23 weight parts of soft pitch (softening point according to Kraemer-Sarnow 52° – 56°C) with addition of water, the mixing taking place at about 70°C. The resulting mixture was placed in an extruder and formed into cylindrical bodies having a diameter of 2 mm. The formed bodies were then introduced into a rotating oven where, with exclusion of air, they were subjected to an average temperature increase of 10° per minute until a final temperature of 800°C had been obtained. At 750°C a nitrogen gas stream was introduced into the oven. After reaching a temperature of 800°C there was introduced together with the nitrogen gas stream 100 g benzene/$Nm^3$ and this treatment continued at constant temperature for 20 minutes. Thereafter, the bodies were cooled under pure nitrogen.

The test for evaluation of the resultant bodies as described above was carried out and there was produced a gas having the following composition: 54 volume % oxygen and 46 volume % nitrogen. When the test was repeated using, instead of air, a gas containing 50 volume % oxygen and 50 volume % nitrogen the composition of the resulting gas was to 80% oxygen and 17% nitrogen.

If instead of air, a gas mixture consisting of 23 volume % oxygen and 77 volume % Ar was used the final gas composition was 59% oxygen and 41% Ar.

EXAMPLE 2

77 Weight parts of mineral coal all of the particles which have a particle size of less than 0.08 mm was treated in a fluidized bed with air at 230°C so as to obtain to an oxygen content of up to 12 weight %. Then, the coal was mixed with 23 weight parts of soft pitch (softening point according to Kraemer-Sarnow 52° – 56°C) with addition of water at 70°C. The mixture was placed in an extrusion press and shaped into cylindrical bodies having a diameter of 2 mm and then treated, under exclusion of air in a rotating oven, with an average temperature increase of 10° per minute, until a final temperature of 800°C was reached. The thusly treated bodies had a volatile components content of 2%. Then, with the introduction of nitrogen, the bodies were cooled to room temperature.

The test for evaluating the bodies resulted in a gas having the following composition: 42 volume % oxygen and 58 volume % nitrogen.

EXAMPLE 3

80% anthracite having 8% volatile components, and 20% bituminous coal, having 20.5% volatile components, have particle sizes of 0 – 0.5 mm with the finest particle component 55 – 60% amounting to and having a particle size of less than 0.06 mm. The coal was formed into balls with spraying of water and pelletized to a size of 3 mm. The pellets were heated in a rotating oven at 750°C to form coke by passing nitrogen thereover for 30 minutes, 100 g toluene per $Nm^3$ then being added to the gas stream. Coke having a volatile components content of 3% was obtained. Thereafter the coke pellets were cooled under an inert nitrogen gas stream.

The test for evaluating the coke yielded a gas of the following composition: 37 volume % $O_2$ and 63 volume % $N_2$.

EXAMPLE 4

76 Weight parts of wood coke all of the particles of which have a particle size of less than 0.1 mm were mixed with 4 weight parts of soft pitch (softening point according to Kraemer-Sarnow of 52°–56°C) with addition of water at about 70°C. The mixture was then introduced into an extrusion press and cylindrical shaped bodies having a diameter of 2 mm formed. The bodies were introduced into a rotating oven and were heated therein, with exclusion of air, at temperature increases amounting on the average to 10°C per minute until a final temperature of 800°C had been reached. Thereafter, with introduction of nitrogen, the bodies were cooled to room temperature. The thusly formed product had a volatile components content of 1.5%.

The test for evaluating the quality of the bodies resulted in a gas having a composition of 38 volume % oxygen and 62 volume % nitrogen.

EXAMPLE 5

76 Weight parts of wood coke all of the particles of which have a particle size of less than 0.1 mm were mixed with 24 weight parts of soft pitch (softening point according to Kraemer-Sarnow of 52° – 56°C) with addition of water at about 70°C. The mixture was then introduced into an extrusion press and formed into cylindrical bodies having a diameter of 2 mm. The bodies were introduced into a rotating oven and, with exclusion of air, carbonized by increasing the temperature at an average of 10° per minute until a final temperature of 800°C had been reached. After a temperature of 750°C had been reached, a nitrogen gas stream was introduced and after a temperature of 800°C had been established isopropanol in an amount of 100 g/Nm³ was charged. The treatment in the isopropanol-nitrogen atmosphere lasted for 20 minutes. Thereafter the bodies were cooled under a pure nitrogen atmosphere.

When the test for evaluating the quality was carried out, a gas having a composition of 49 volume % oxygen and 51 volume % nitrogen was obtained.

EXAMPLE 6

Coconut shell material having a particle size of 1 to 3 mm was introduced into a rotating oven and heated up at a rate of 3° per minute until the temperature of 750°C had been reached and the volatile components content was 4.5%. This temperature was maintained constant for 30 minutes and during this time there was introduced into the oven a stream of ethylene gas. Thereafter the bodies were cooled under pure nitrogen.

When the evaluation test was carried out, a gas having a composition of 50.5 volume % oxygen and 49.5 volume % nitrogen was obtained.

EXAMPLE 7

75 Weight parts of mineral coal, the particle size of which was less than 0.08 mm for all of the particles, was preoxidized in a fluidized bed with oxygen at 230°C to obtain an oxygen content of 12 weight %. This product was mixed with 20 weight parts of soft pitch (softening point according to Kraemer-Sarnow of 52° – 56°C) with addition of water at about 70°C. This mixture was then introduced into an extrusion press and cylindrical shaped bodies having a diameter of 2 mm formed. The bodies were then charged into a rotating oven and heated therein, with exclusion of air, at an average temperature increase of 10°/min. until a final temperature of 800°C had been reached. Then, with the introduction of nitrogen, the bodies were cooled to room temperature. In a second treatment step, the product was again heated in nitrogen to 800°C. Then, low temperature carbonization gas obtained in a coking procedure was introduced. After 30 minutes the bodies were cooled under nitrogen to room temperature.

The test for evaluating the quality of the bodies was carried out and a gas having a composition of 45 volume % oxygen and 55 volume % nitrogen obtained.

EXAMPLE 8

Peat coke was worked up to a particle size of 1 to 3 mm and heated in a rotating oven under nitrogen to 800°C. Then, gaseous toluene was introduced with the nitrogen gas stream, and the temperature maintained constant for 30 minutes. Finally the bodies were cooled in pure nitrogen.

The test for evaluating the quality of the bodies produced a gas having a composition of 36 volume % oxygen and 64 volume % nitrogen.

The 2 adsorption vessels as shown in the drawing contain 20 m³ molecular sieve type carbon, manufactured according to Example 1. During the adsorption cycle 6000 m³ air which has neither been dried nor freed of carbon dioxide is charged through each of the adsorption vessels for periods of 100 seconds at a pressure of 1.05 atm. The desorption cycle also takes 100 seconds at a pressure of 50 Torr which is produced by suction. Through alternate operation of the two adsorption vessels a product containing 51% oxygen and 49% nitrogen will be recovered.

2 adsorption vessels, similar to those described in the drawing, are filled with 1000 ccm molecular sieve type carbon manufactured according to Example 6. Adsorption is achieved by pumping a gas volume of 28000 ccm, consisting of 5% He and 95% $CH_4$, alternately into each adsorption vessel, using a pressure of 40 atm. The time required amounts to 30 seconds. In the second step of the procedure the pressure is abruptly released to 1 atm. In step 3, desorption takes place at pressures reaching a minimum of 20 Torr by use of suction. 1000 ccm of gas containing 20% He and 80% $CH_4$ will be recovered.

What is claimed is:

1. A method of separating oxygen from gas mixtures containing oxygen and nitrogen, comprising passing a gas mixture which contains oxygen and nitrogen through a carbon containing molecular sieve prepared by heating in a closed oven in the absence of air at a coking temperature of at least 600°C, particles of a cokable substance having a size between 0.1 and 20 millimeters until the content of volatile components in the resulting coke is not more than 5% by weight and thereafter subjecting the resulting coke to heating in an inert atmosphere at a temperature between 600° and 900°C while a gaseous stream of a carbonaceous substance which splits off carbon at said temperature is passed into contact with the said coke for such a period between 1 and 60 minutes that the carbon that is thus split off is deposited in the pores of the coke and reduces the effective average size of the pores to less than about 0.3 millimicron, whereby the oxygen in said gas mixture is more rapidly adsorbed by said molecular sieve than the nitrogen in said gas mixture.

2. A method as defined in claim 1, wherein said gaseous mixture is passed through said molecular sieve at pressures between substantially 1 and 40 atmospheres.

3. A method as defined in claim 1, wherein said gaseous mixture is passed through said molecular sieve for a period between substantially 0.5 and 5 minutes.

4. A method as defined in claim 1, wherein said gaseous mixture is passed through said molecular sieve for a period between substantially 10 and 60 seconds.

5. A method as defined in claim 1, said molecular sieve having a predetermined volume; and wherein a volume of said gaseous mixture which equals substantially 2 to 20 times said predetermined volume is passed through said molecular sieve.

6. A method as defined in claim 1; and further comprising the step of desorbing the adsorbed gas from said molecular sieve.

7. A method as defined in claim 6, wherein the proportion of said first gas in the desorbed gas is greater than the proportion of said first gas in said gaseous mixture.

8. A method as defined in claim 6, wherein said desorption is effected by subjecting said molecular sieve to pressures lower than atmospheric pressure.

9. A method as defined in claim 8, wherein said desorption is carried out at pressures in excess of substantially 20 torr.

10. A method as defined in claim 6, wherein said desorption is carried out for a period between substantially 0.5 and 5 minutes.

11. A method as defined in claim 6, wherein said gaseous mixture is passed through said molecular sieve at pressures in excess of a predetermined pressure; and further comprising the step of abruptly reducing the pressure to said predetermined pressure prior to said desorption.

12. A method as defined in claim 6, said molecular sieve comprising at least two discrete portions; and wherein the steps of passing said gaseous mixture through said molecular sieve and desorbing the adsorbed gas from said molecular sieve are performed alternately for each of said portions.

13. A method as defined in claim 6, wherein said gaseous mixture is passed through said molecular sieve for a period between substantially 0.5 and 5 minutes and at pressures between substantially 1 and 40 atmospheres, said desorption being effected by subjecting said molecular sieve to pressures lower than atmospheric pressure, and said desorption producing a gas which is richer in said oxygen than is said gaseous mixture.

14. A method as defined in claim 13, wherein an equilibrium with respect to adsorption of said oxygen and said nitrogen by said molecular sieve is not achieved during passage of said gaseous mixture through said molecular sieve.

15. A method as defined in claim 13, said gaseous mixture comprising air which has been neither dried nor freed of carbon dioxide, and said molecular sieve having a volume of substantially 20 cubic meters; and wherein about 6000 cubic meters of said air is passed through said molecular sieve during a period of substantially 100 seconds and at a pressure of substantially 1.05 atmospheres, said desorption being carried out for a period of substantially 100 seconds and at a pressure of substantially 50 torr, and said desorption producing a gas containing about 51 percent by volume of said oxygen and 49 percent by volume of said nitrogen.

16. A method as defined in claim 6, said gaseous mixture comprising air, and said molecular sieve having a volume of substantially 1 liter; and wherein said air is passed through said molecular sieve for a period of substantially 1 minute and at a velocity of substantially 30 centimeters per second, said desorption being effected by subjecting said molecular sieve to pressures lower than atmospheric pressure, and said desorption producing a gas which contains a minimum of about 35 percent by volume of oxygen.

17. A method as defined in claim 16, wherein said desorption produces a gas containing between substantially 35 and 60 percent by volume of oxygen.

* * * * *